(12) United States Patent
Gronowski et al.

(10) Patent No.: US 9,032,033 B2
(45) Date of Patent: May 12, 2015

(54) METHOD AND APPARATUS FOR PRIVATE TOKEN COMMUNICATION SERVICES

(75) Inventors: Kristoffer Gronowski, Saratoga, CA (US); Shingo Murakami, Kanagawa (JP)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 294 days.

(21) Appl. No.: 13/553,504

(22) Filed: Jul. 19, 2012

(65) Prior Publication Data

US 2014/0025753 A1   Jan. 23, 2014

(51) Int. Cl.
*G06F 15/16* (2006.01)
*H04L 29/06* (2006.01)

(52) U.S. Cl.
CPC .................................. *H04L 63/0421* (2013.01)

(58) Field of Classification Search
USPC ............................ 709/206, 220, 228; 713/169
See application file for complete search history.

(56) References Cited

U.S. PATENT DOCUMENTS

| 6,161,129 | A  | * | 12/2000 | Rochkind ...................... 709/206 |
| 7,234,059 | B1 | * | 6/2007  | Beaver et al. ................. 713/170 |
| 8,566,247 | B1 | * | 10/2013 | Nagel et al. .................... 705/59 |
| 2004/0088349 | A1 | * | 5/2004 | Beck et al. ..................... 709/203 |
| 2007/0005969 | A1 |   | 1/2007  | Fullerton |
| 2011/0161422 | A1 | * | 6/2011 | Bender et al. ................. 709/204 |

FOREIGN PATENT DOCUMENTS

WO    WO 2012/136652 A1    10/2012

* cited by examiner

*Primary Examiner* — Joon H Hwang
*Assistant Examiner* — Cheikh Ndiaye (57) ABSTRACT

Rather than forcing users to give personally identifying contact data to information providers, this disclosure teaches an apparatus and method enabling the use of "private tokens," which allow information providers to send electronic communications to targeted users without having access to personally identifying contact information. These features are provided by an anonymous communication service that manages the private tokens and provides communication proxy services intermediating the electronic communications between the information providers and the users targeted by those communications.

22 Claims, 4 Drawing Sheets

METHOD AND APPARATUS FOR PRIVATE TOKEN COMMUNICATION SERVICES

TECHNICAL FIELD

The present invention generally relates to communication services, and particularly to the use of private tokens in a communications service.

BACKGROUND

Modern communication and computer networks provide users with ready access to rich sources of information. For example, many vendors provide online product information, discount coupons, purchasing information, etc. Accessing such information often requires no more effort than navigating to the vendor's web site, or otherwise using an application, web browser, or other "user agent" to communicate with a vendor's server.

However, vendors and other information providers frequently require users to leave email addresses, postal addresses, telephone numbers, or other personally identifying information. Some companies use identifying information only to provide the information in which users have expressed an interest, and they do not make such information available to third parties. Not all companies exercise such restraint. For example, personally identifying contact information provided by a user to one company frequently ends up being shared or sold to other companies, one or more of which may use the information to spam the user, or to otherwise send unsolicited information of questionable interest to the user.

SUMMARY

Rather than forcing users to give personally identifying contact data to information providers, this disclosure teaches the use of "private tokens," which allow information providers to send electronic communications to targeted users without having access to personally identifying contact information. These features are provided by an anonymous communication service that manages the private tokens and provides communication proxy services intermediating the electronic communications between the information providers and the users targeted by those communications.

In some embodiments, a method of providing an anonymous communication service between a first party and a second party comprises a number of operations performed by an anonymous communication service. In an example scenario, the first party is a user—e.g., represented by a web browser or other user agent, running on the user's computer or smartphone—and the second party is a merchant, vendor, or other organization represented by a web server or other computer system accessible by the user agent.

In an example configuration, the method includes receiving a connection request at an anonymous services host, from a user agent being redirected to the anonymous services host from a first external server. Here, the user agent is associated with the first party, and the first external server is associated with the second party. As non-limiting examples, the user agent is a web browser or other application running on a computer or smartphone associated with the first party, and the external server is a web server or other network-accessible computer system that is accessible by the user agent.

The method further includes identifying the second party and a proposed communication between the second party and the first party, from information received in conjunction with the connection request. For example, information received in or in conjunction with the redirection identifies the second party and indicates the type of electronic communication proposed, e.g., an email, video message, etc.

The method further includes obtaining an indication that the first party consents to the proposed communication. The anonymous services host may receive the consent indication from the user agent, e.g., in response to user input directed to the user agent, or by accessing stored information from which consent can be determined, e.g., default or preconfigured consent settings. If consent is indicated, the method includes generating a private token for anonymously transacting the proposed communication. Here, the private token is a data object that includes a token identifier that does not reveal actual contact information of the first party but is privately mapped by the anonymous services host to the actual contact information of the first party.

Correspondingly, the method includes redirecting the user agent back to the first or a second external server associated with the second party, in response to the indication of consent. The redirection includes sending a temporary token identifier for use by the second party in requesting the private token. The particular mechanism for redirecting and sending the temporary token identifier depends on the involved communication protocol. For example, for HTTP-based transactions, redirection may involve returning a certain status code to the user agent.

The above operations result in the second party receiving the temporary token identifier, and the method includes sending the private token to the second party in response to receiving a token request from the second party that indicates the temporary token identifier. Here, the anonymous services host verifies the temporary token identifier and may further verify the identity of the second party, to ensure that the private token being requested was generated for use by the second party. This feature prevents issuance of private tokens unless the temporary token identifier is valid and matches the expected requestor identity.

Assuming that the private token was issued, the method includes at some later time receiving the (previously issued) private token from the second party, in conjunction with the second party attempting an electronic communication, and verifying that the private token is valid and that the electronic communication conforms to the proposed communication. In response to such verifications, the method includes relaying the electronic communication through an intermediate communications proxy, based on mapping the private token to the actual contact information of the first party.

An anonymous communication services system configured to perform the above method, for example, comprises an anonymous services host and an intermediate communications proxy. The anonymous services host includes one or more communication interfaces, for communicating with the first and second parties, e.g., computer network interfaces supporting Internet-based connections. Further, the anonymous services host includes processing circuits associated with the communication interface(s) and configured to perform the above-described private token processing.

Further, in at least some embodiments, the anonymous communication services system includes the aforementioned intermediate communications proxy. The proxy acts as an intermediary that protects the first party's anonymity, by relaying the electronic communication between the second party and the first party.

In an example configuration, the intermediate communications proxy includes one or more communication interfaces and associated processing circuits, which are configured to, in response to verification of a private token and an associated electronic communication by the anonymous services host, relay the electronic communication to the first party, based on mapping the private token to the actual contact information of the first party. Depending upon its network connections and desired configuration, the intermediate communications proxy may be configured to relay (forward) email addresses, videos, and other electronic messages and/or may be configured to interconnect voice calls, data connections, or other streaming connections between the second and first parties.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
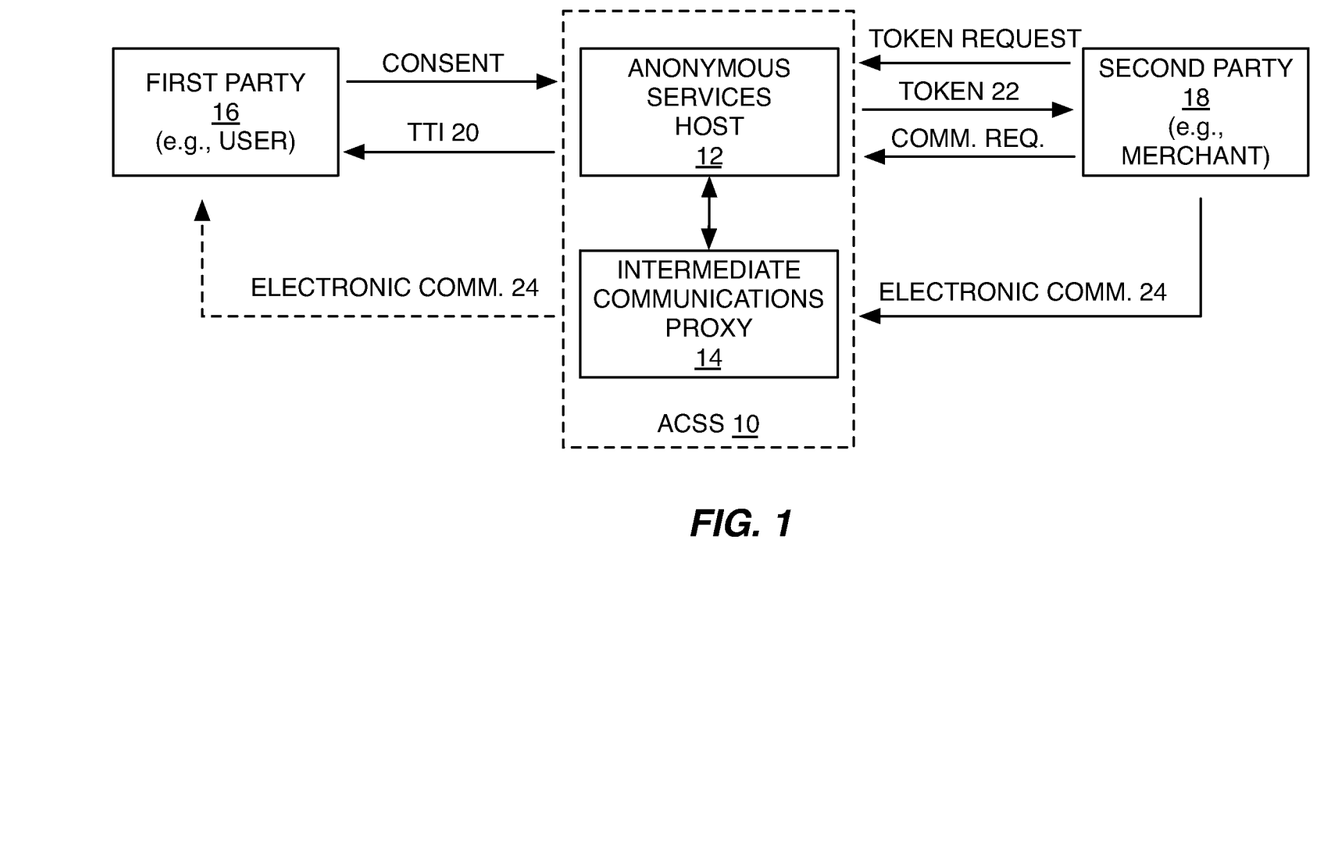
FIG. 1 is a block diagram of one embodiment of an anonymous communication services system, including an anonymous services host and an intermediate communications proxy.

FIG. 1 illustrates one embodiment of an anonymous communication services system 10 (hereafter "ACSS 10") comprising an anonymous services host 12 and an intermediate communications proxy 14. The ACSS 10 is configured to enable anonymous communication between a first party 16 and a second party 18, and it will be appreciated that the ACSS 10 comprises one or more servers or other network-accessible computer systems, and that the intermediate communications proxy 14 may include any number of communication interface types and provide any number of corresponding intermediary communication functions.

For example, the ACSS 10 may be configured to receive and forward emails, SMSs, MMSs, video clips, electronic documents, or essentially any type of electronic message. Additionally, or alternatively, it may be configured to provide voice, data, or other streaming connections and, as such, it may include interfaces to or connectivity with communication network nodes, such as IP Multimedia Subsystem (IMS) connectivity, to support interconnection of IP sessions or other connections between the first and second parties 16 and 18.

Anonymous communication services as contemplated herein relies on the exchange of various data items in electronic form between the first party 16 and the ACSS 10 and/or between the ACSS 10 and the second party 18. One sees, for example, a temporary token identifier ("TTI") 20 going from the ACSS 10 to the first party 16, a private token 22 corresponding to the temporary token identifier 20 and sent from the ACSS 10 to the second party 18, and an electronic communication 24 between the second party 18 and the first party 16, as intermediated by the intermediate communications proxy 14.

Figure 4:
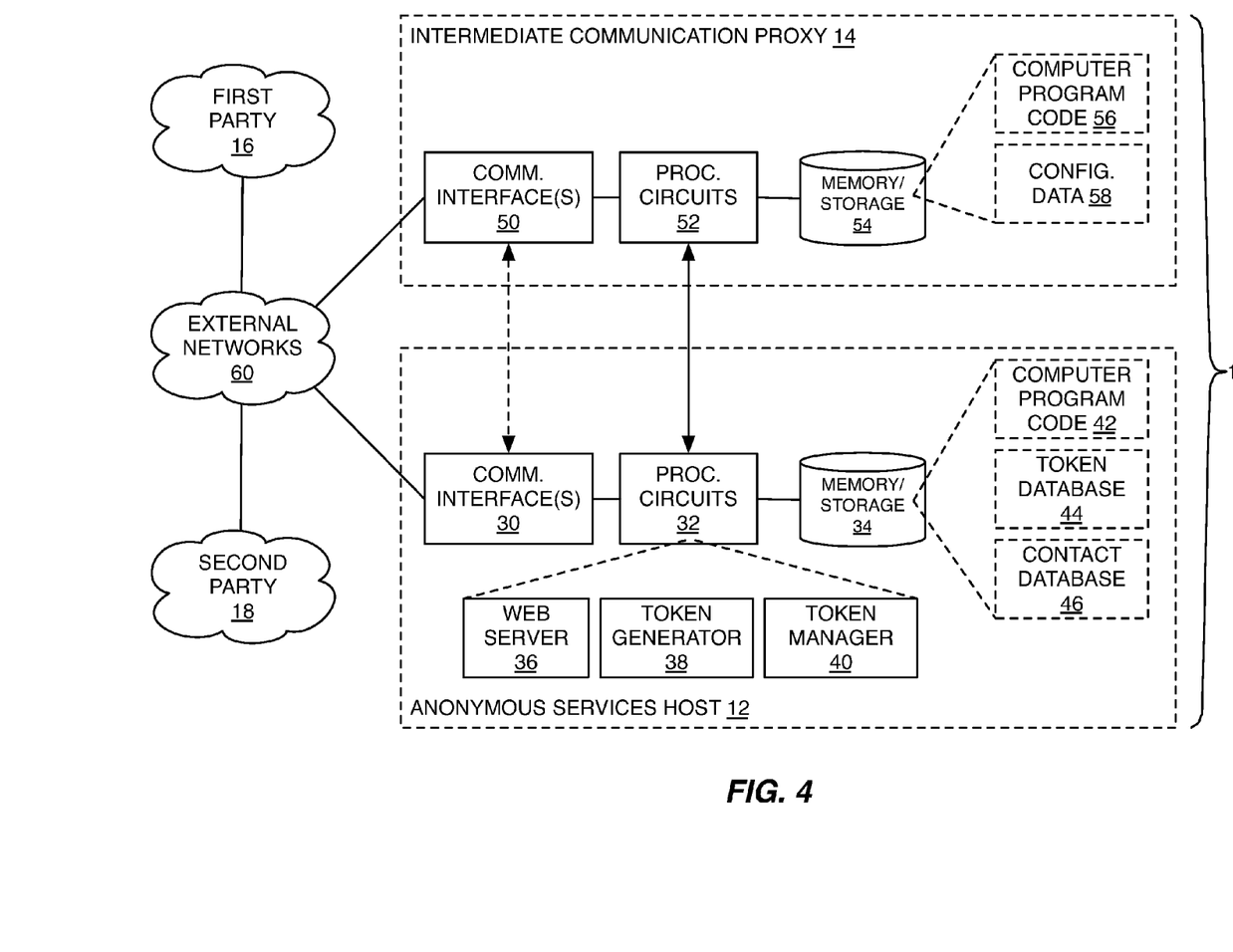
FIG. 4 is a block diagram of example details for an embodiment of an anonymous communication services system, including an anonymous services host and an intermediate communications proxy.

Referring to FIG. 4 temporarily, one sees an example embodiment of the ACSS 10. The anonymous services host 12 includes one or more communication interfaces 30 and associated processing circuits 32. The processing circuits 32 are configured to receive a connection request at an anonymous services host 12 from a "user agent" being redirected to the anonymous services host 12 from a first external server. Here, the user agent will be understood as being a web browser or other application running, for example, on a computer or smartphone, and configured to act as the first party 16 in this context. Similarly, the "first external server" is one or more servers or computer systems that are accessible by the user agent. Thus, the second party 18 is represented by the external server(s) involved in the transactions at issue here.

The processing circuits 32 are configured to identify the second party 18 and a proposed communication between the second party 18 and the first party 16, from information received in conjunction with the connection request. For example, the ACSS 10 may identify the second party 18 in terms of a company name or other unique identifier included in the redirect information, and may also identify the type of communication proposed from such information. Communication "types" here may be email, SMS, MMS, file (e.g., PDF file), voice call, data call, etc. It is not necessary that the intermediate communication proxy 14 in a given ACSS 10 support a particular set or range of communication types, e.g., it may be of considerable value if the ACSS 10 is configured simply to forward emails and email attachments in such a way that first parties 16 can receive emails from second parties 18 without having to expose their actual email addresses to the second parties 18.

In any case, the processing circuits 32 are configured to obtain an indication that the first party 16 consents to the proposed communication and (if there is consent) generate a private token 22 for anonymously transacting the proposed communication. The private token 22 includes a token identifier that does not reveal actual contact information of the first party 16 but is privately mapped by the anonymous services host 12 to the actual contact information of the first party 16.

The processing circuits 32 are further configured to redirect the user agent back to the first or a second external server associated with the second party 18, in response to the indication of consent. Here, "redirecting" includes sending a temporary token identifier 20 for use by the second party 18 in requesting the private token 22 and the processing circuits 32 are configured to send the private token 22 to the second party 18, in response to receiving a token request from the second party 18 that indicates the temporary token identifier 20. Such processing includes, in an example embodiment, receiving the temporary token identifier 20 from the second party 18 along with a shared secret that is maintained between the anonymous services host 12 and the second party 18.

The processing circuits 32 are further configured to receive the private token 22 from the second party 18 in conjunction with the second party 18 attempting an electronic communication 24. Here, it will be understood that the attempted use of the private token 22 by the second party 18 may be immediately after it is issued by the ACSS 10, or may be some indeterminate time later. It will also be appreciated that the private token 22 can be generated with a finite validity period, meaning that it is subject to expiration and further meaning that the second party 18 must attempt the electronic communication 24 within any applicable validity period of the private token 22.

The processing circuits 32 are configured to verify that the private token 22 is valid and that the electronic communication 24 conforms to the proposed communication for which the private token 22 was generated. In an example case, a private token 22 generated for use in sending an email would not be allowed for use in sending a SMS. Of course, it is also contemplated that a given private token 22 may be generated for use with more than one type of communication, but records within the ACSS 10 or data within the private token 22 will control which type or types of communication are authorized by the private token 22.

To support the above operations and features, in an example embodiment, the anonymous services host 12 further includes memory/storage 34, and the processing circuits 32 include a web server 36, a token generator 38, and a token manager 40. These functions may be realized in separate nodes or in an integrated node, and it will be understood that the anonymous services host 12 may be a single processing system, multiple co-located processing systems, or a collection of network processing systems. In any case, the anonymous services host functionality may be implemented in whole or in part based on the execution of computer program instructions 42 (code), which are stored in memory, on disk, or in one or more other computer-readable mediums accessible to the anonymous services host 12.

The same or different storage may be used to hold a token database 44 and/or a contact database 46. In one example, the token database 44 holds records of issued private tokens 22, along with usage and/or validity parameters governing usage of those private tokens 22. The contact database 46 in one example holds actual contact data for the first parties 16 for whom private tokens 22 have been issued, or, in a larger sense, for those first parties 16 that have submitted information to the ACSS 10 or otherwise subscribed to anonymous communication services.

FIG. 4 also illustrates an example configuration of the intermediate communications proxy 14, which includes one or more communication interfaces 50, along with associated processing circuits 52 and memory/storage 54. The intermediate communications proxy 14 may be configured in whole or in part based on its execution of computer program instructions (code) 56 stored in the memory/storage 54 or in some other computer-readable medium accessible to the processing circuits 52. The same memory/storage or other memory/storage also may hold certain configuration data 58, e.g., provisioning data.

As noted, the type and number of communication interface(s) 30 in the anonymous services host 12 will depend on the desired connectivity. The anonymous services host 12 is a web server in one example and includes one or more network interfaces coupling the anonymous services host 12 to an IP data network.

More generally the communication interface(s) 30 couple the anonymous services host 12 to one or more external communication networks 60, e.g., the Internet, the PSTN, one or more IMS networks, etc. The communication interface(s) 50 of the intermediate communications proxy 14 likewise couple it to one or more of the same external networks 60 and/or to different ones of them. The number and type of external networks 60 to which the intermediate communications proxy 14 attaches will depend on the different types of electronic communications 24 it is intended to relay between second parties 18 to first parties 16.

With the above arrangement, the processing circuits 52 of the intermediate communications proxy 14 are configured to relay a given electronic communication 24 to a given first party 16, based on mapping a given private token 22 to the actual contact information of the given first party 16. In this context, it will be understood that a particular second party 18 has attempted a particular electronic communication 24 using a particular private token 22. Thus, the relaying function provided by the intermediate communications proxy 14 is contingent on the anonymous services host 12 verifying the private token 22 and the electronic communication 24.

A number of operational variations are contemplated herein. For example, the anonymous services host 12 may be configured to obtain the indication that a first party 16 consents to a proposed communication, based on being configured to interact with the first party 16 through a connection with the user agent of the first party 16. Interaction in this case may comprise the anonymous services host 12 prompting the user to input an affirmative indication of consent via the user agent. In another example, the anonymous services host 12 is configured to obtain the indication that the first party 16 consents to the proposed communications based on being configured to evaluate consent information stored for the first party 16 in a database 46 in or accessible to the anonymous services host 12.

The anonymous services host 12 also may be configured to receive the actual contact information of first parties 16 either from stored contact information 46 accessible to the anonymous services host 12. Additionally, or alternatively, the anonymous services host 12 is configured to obtain the actual contact information from input received through the user agents of those first parties 16.

The anonymous services host 12 also may be configured to provide revocation and other token management services. In an example, the anonymous services host 12 enables first parties 16 to revoke previously issued private tokens 22, and in this manner prevent given second parties 18 from using or continuing to use private tokens 22 in their possession. A token management interface, e.g., accessible through a web browser or other user agent, allows individual first parties 16 to review and revoke private tokens 22 issued on their behalf. Thus, in some embodiments, the anonymous services host 12 is configured to receive a revocation request from the first party 16 and, in response, mark the private token 22 as revoked, to thereby prevent verification of the private token 22 in any later attempt by the second party 18 to use the private token 22.

Additionally, or alternatively, the anonymous services host 12 generates at least some of the private tokens 22 that it issues as single-use tokens or "N-use" tokens, where "N" is some integer number defining how many times a given private token 22 can be used. The anonymous services host 12 also may generate at least some private tokens 22 as "limited-life" tokens that have a built in expiration time.

Verification of a private token 22 submitted by a second party 18 therefore may include verification that the associated first party 16 has not requested revocation of the private token 22. Verification may further include the anonymous services host 12 checking all other applicable usage constraints, such as time expiration, usage count, etc. Of course, as already noted, usage of any given private token 22 as submitted by a given second party 18 is also subject to the anonymous services host 12 determining that the private token 22 "belongs" to the second party 18 that submitted it.

In more detail, the anonymous services host 12 is configured to generate private tokens 22 so that each private token 22 is uniquely keyed to identifying information for the involved first and second parties 16, 18, and to the proposed communication. Such generation restricts usage of any given private token 22 only to correctly identified second party 18 and only for the proposed communication.

Assuming that the correct second party 18 has submitted a valid private token 22 in conjunction with attempting an electronic communication 24, and further assuming that the electronic communication 24 conforms to the communication proposed in conjunction with generation and issuance of the private token 22, the intermediate communications proxy 14 "relays" the electronic communication 24 to the first party 16.

In the case that the electronic communication 24 is an electronic message (email, SMS, MMS, file, etc.), the intermediate communications proxy 14 receives the electronic message at a first address that was specified by the private token 22 and forwards the electronic message to a second address that is known for the first party 16 from the actual contact information of the first party 16. This process can be understood as the second party 18 sending the electronic message to an address that does not identify the first party 16 but maps to an actual address of the first party 16, according to information known within the ACSS 10.

In the case that the electronic communication 24 is a voice call, data call, or other "connection" type communication (e.g., a circuit-switched or packet-switched voice call, a multimedia data session, etc.), the intermediate communications proxy 14 is configured to initiate an electronic connection between the second and first parties via the intermediate communications proxy 14. Here, the private token 22 specifies a first contact number for use by the second party 18 in initiating the electronic connection, and the intermediate communications proxy 14 is configured to map that first contact number to a second contact number that is known for the first party 16 from the actual contact information of the first party 16.

With the above examples in mind, it will be appreciated that the ACSS 10 in one or more embodiments is a system configured to issue private tokens 22 on demand, to enable anonymous communications between individual first parties 16 and respective second parties 18, in conformance with and subject to all limitations imposed by the private tokens 22. The ACSS 10 in such an embodiment is further configured to revoke particular ones of the issued private tokens 22 responsive to one or more automatic revocation parameters being satisfied or responsive to explicitly received revocation requests from the involved first parties 16 for whom the particular private tokens 22 were issued. Further, the ACSS 10 is configured to enable the proposed communications via the intermediate communications proxy 14 on an on-demand basis, in response to receiving and verifying individual ones of the private tokens 22 in conjunction with attempted electronic communications by given ones of the second parties 18 submitting those individual private tokens 22.

Figure 2:
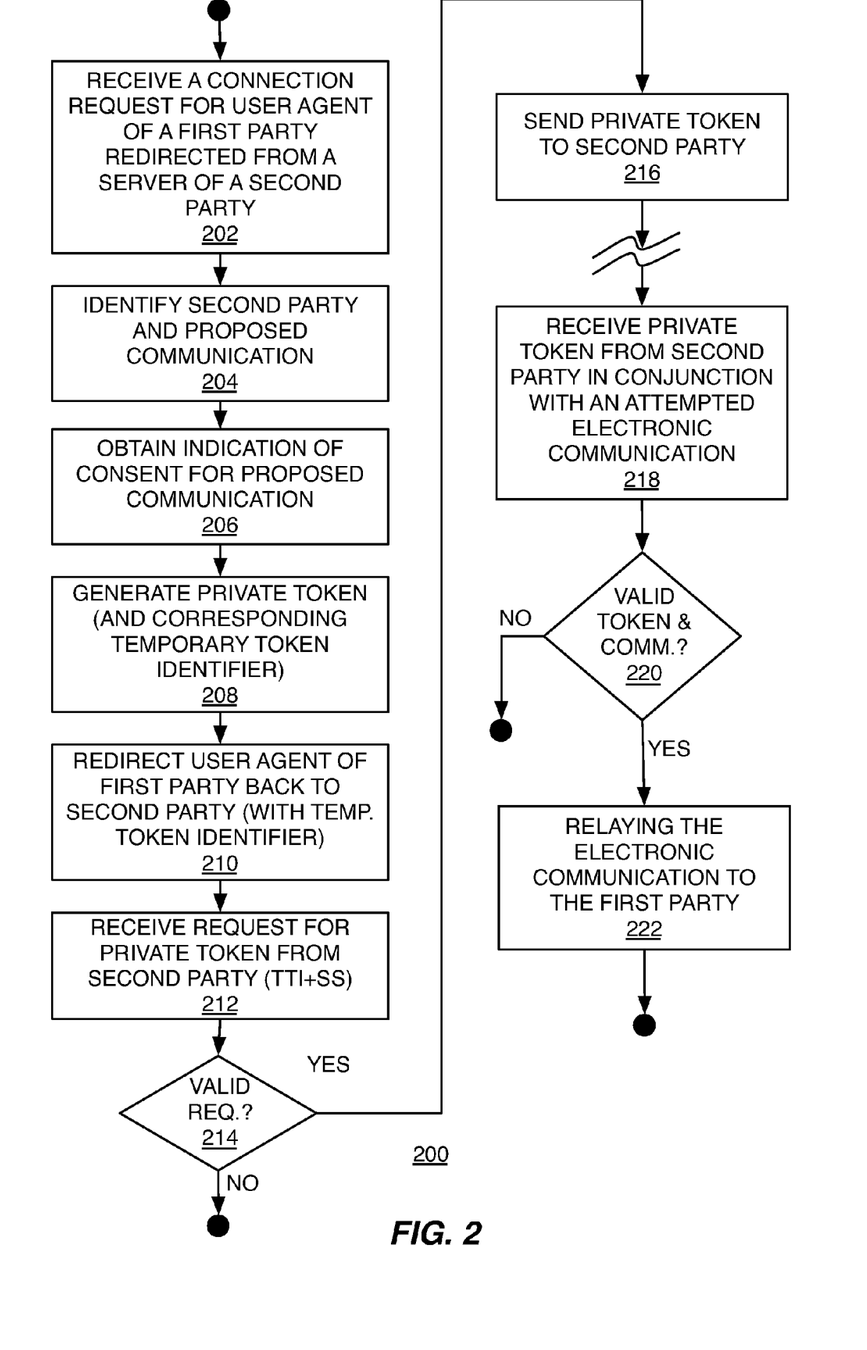
FIG. 2 is a logic flow diagram of one embodiment of a method of providing anonymous communication services between first and second parties.

FIG. 2 illustrates an example method 200, as implemented by the ACSS 10. The method 200 includes receiving (Block 202) a connection request at an anonymous services host 12 from a user agent being redirected to the anonymous services host 12 from a first external server, where the user agent is associated with the first party 16 and the first external server is associated with the second party 18.

The method 200 further includes identifying (Block 204) the second party 18 and a proposed communication between the second party 18 and the first party 16, from information received in conjunction with the connection request, obtaining (Block 206) an indication that the first party 16 consents to the proposed communication, and generating (Block 208) a private token 22 for anonymously transacting the proposed communication. As before, the private token 22 includes a token identifier that does not reveal actual contact information of the first party 16 but is privately mapped by the anonymous services host 12 to the actual contact information of the first party 16.

Continuing, the method 200 further includes redirecting (Block 210) the user agent back to the first or a second external server associated with the second party 18, in response to the indication of consent. Information sent as part of the redirection includes a temporary token identifier 20 for use by the second party 18 in requesting the private token 22. Accordingly, the ACSS 10 then receives (immediately or at some later time) a request from the second party 18 for the private token 22 (Block 212).

The request includes the temporary token identifier 20. If the request is "valid" (e.g., the ID of the second party 18 is verified as being correct, and the temporary token identifier 20 is verified as being valid), then the method 200 continues (YES from Block 214) with the ACSS 10 sending (Block 216) the private token 22 to the second party 18, for use by the second party 18. Note that the verification performed in some embodiments of the Block 212 processing includes verification of a shared secret (SS) maintained between the anonymous services host 12 and the second party 18, and verification of the temporary token identifier (TTI) 20.

Then, perhaps immediately or at some later time, the ACSS 10 receives (Block 218) the private token 22 from the second party 18 in conjunction with the second party 18 attempting an electronic communication 24. In response, the ACSS 10 verifies (Block 220) that the private token 22 is valid and that the electronic communication 24 conforms to the proposed communication.

In response to such verifications, processing continues with relaying (Block 222) the electronic communication 24 through the intermediate communications proxy 14, based on mapping the private token 22 to the actual contact information of the first party 16. One of the advantages of such mapping is that the contact information of the first party 16 may be changed or otherwise updated at the ACSS 10 without voiding the private token 22. That is, because the ACSS 10 is the entity that maintains the associations between issued private tokens 22 and corresponding contact information for first parties 16, a previously issued private token 22 remains usable even if the contact information for the corresponding first party 16 changes, as long as those changes are recorded at the ACSS 10.

Of course, if the electronic communication 24 does not match that proposed for initial issuance of the private token 22, or if the private token 22 is invalid as revoked or expired, or if the identify of the second party 18 submitting the private token 22 does not match the identity of the second party 18 to whom the private token 22 was initially granted, the ACSS 10 does not relay the electronic communication 24.

Figure 3:
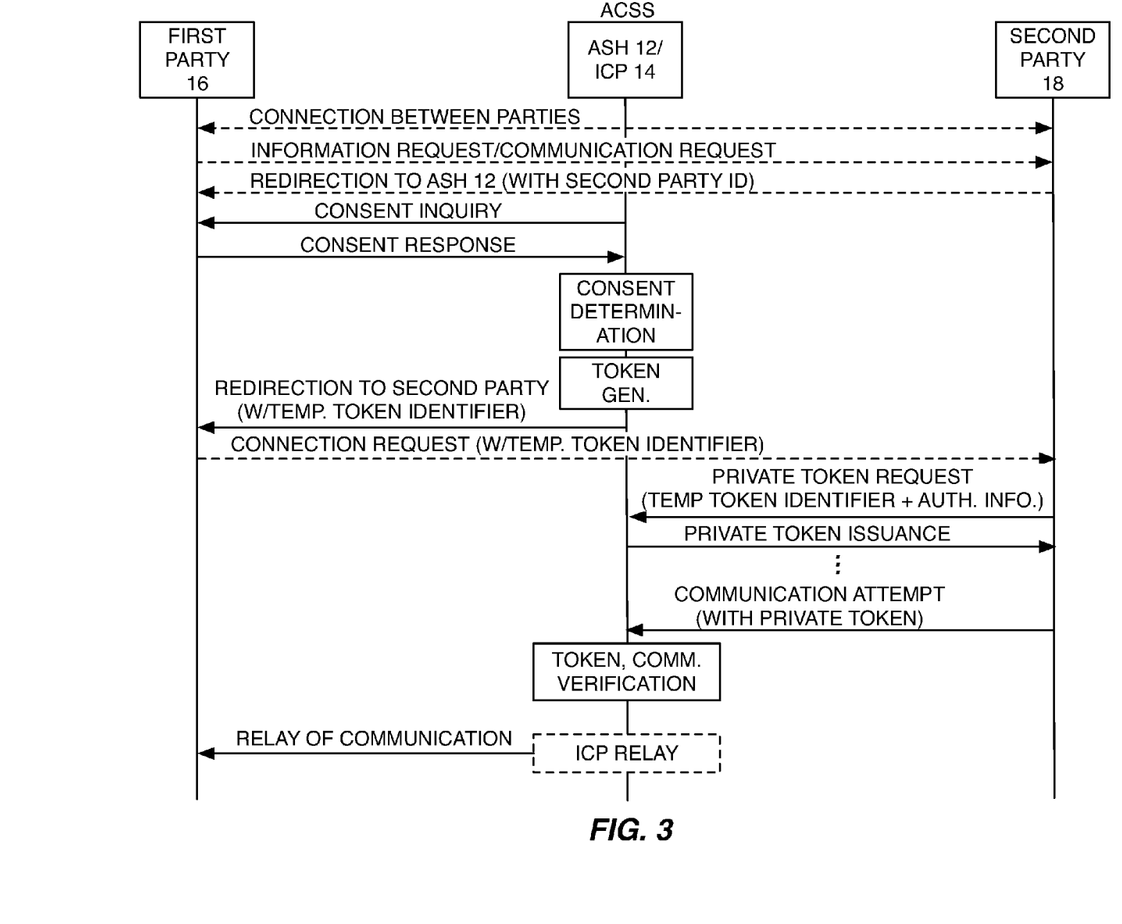
FIG. 3 is a call flow diagram of example connections and signaling associated with providing anonymous communication services between first and second parties.

FIG. 3 illustrates such processing in a "signal" flow diagram. One sees that the process begins with a connection between a given first party 16 and a given second party 18. For example, the user agent of the first party 16 may be a web browser, and that web browser may be connected to a web server of the second party 18. Now, in this regard, the second party 18 may know something about the first party 16, e.g., from stored cookies or other electronic files, from network identifiers, etc., but it is presumed here that personal contact information, such as email address, postal address, phone number, etc., for the first party 16 are not known to the second party 18.

In an example case, the website of the second party 18 offers an "information request" link or the like, which triggers a redirection to the anonymous services host 12 of the ACSS 10 when the first party 16 clicks the link. The redirection carries with it information identifying the second party 18 and the proposed communication, which will be used in private token generation, if the ACSS 10 obtains an indication of consent by the first party 16 to the proposed communication. In one example, the anonymous services host 12 provides a web page through which the first party 16 indicates consent.

If consent is obtained, the ACSS 10 generates a private token 22 and redirects the first party 16 back to the second party 18—e.g., a redirection of the first party's web browser back to the second party's website, or to another website associated with the second party 18. Redirection information carried back to the second party 18 includes a temporary token identifier 20, to be used by the second party 18 in requesting the private token 22 generated for the proposed communication between the first and second parties 16, 18.

That is, in a transaction conducted between the ACSS 10 and the second party 18, in which the transaction is separate from the first party 16, the second party 18 uses the temporary token identifier 20 to obtain the private token 22 needed for attempting an electronic communication 24 intended for the first party 16. In an example of private token issuance, a shared secret is maintained between the ACSS 10 and the second party 18, and this shared secret is used in a verification process that controls issuance of the private token 22.

More broadly, the ACSS 10 authenticates the second party 18 before issuing the requested private token 22 to the second party 18. As non-limiting examples, authentication may be based on evaluating a shared secret known to the ACSS 10 and the second party 18 and/or based on Public Key Infrastructure (PKI) or other certificate authentication protocols, such as are based on web SSL certificates, where the second party 18 has a private key, and the ACSS 10 has the corresponding public key that it uses for validation. In any case, in some embodiments, the request by a second party 18 for a private token 22 includes a temporary token identifier 20 and authentication information (e.g., shared secret, public key, etc.) that the ACSS 10 uses to authenticate the second party 18. In that manner, issuance of the private token 22 to the requesting second party 18 is conditioned on validation of the temporary token identifier 20 and on authentication of the authentication information.

Assuming that the private token 22 was issued to the second party 18, the second party 18 subsequently attempts an electronic communication 24 using the private token 22, and the ACSS 10 verifies the communication and the private token 22. If those verifications are successful, the ACSS 10 relays the electronic communication to the first party 16. Note, too, that the ACSS 10 in one or more embodiments remembers prior transactions and adjusts its operations in response. For example, if a given first party 16 has previously approved similar communications from a given second party 18, the ACSS 10 may simply prompt the first user 16 to confirm that one or more additional private tokens 22 should be issued to the second party 18.

Of course, the ACSS 10 would still allow a first party 16 to revoke individual ones of the private tokens 22 held by a given second party 18, or all tokens held by a given second party 18, and in at least one embodiment, the ACSS 10 provides a token management web page or other interface to first users 16, showing all outstanding private tokens 22, their associated second parties 18, communication types, etc. First users 16 can make selective or wholesale revocations or modifications to their outstanding private tokens 22 using this interface.

Further, the ACSS 10 in some embodiments operates according to the OAuth 2.0 standards, for providing its private token communication services. Developed by the Internet Engineering Task Force (IETF) OAuth Working Group (WG), OAuth 2.0 is an open standard for authorization. Additional information can be found at www.oauth.net.

An example use case begins with an end user (i.e., a first party 16) browsing the web and ending up on a merchant site (i.e., a second party 18). The user wants to leave contact information since she is interested in the offering but is reluctant to leave her actual contact information. The merchant's website presents the option of using the private token communication service offered by an ACSS 10.

In this regard, it is assumed that the merchant has an OAuth client_id that will be used by the ACSS 10. Thus, the merchant website redirects the end user to the ACSS 10, where that redirection includes OAuth information for the merchant. Assuming the end user consents to the proposed communication, the ACSS 10 generates the private token 22 so that it is keyed to the OAuth client_id of the merchant.

In one example, the ACSS 10 connects a voice call between the two. Input parameters to the ACSS 10 for the merchant are: (1) a phone number to an available sales representative of the merchant; and (2) a private token 22 representing the end user that the merchant wants to contact. The intermediate communications proxy 14 of the ACSS 10 thus acts as a proxy for the end user, connecting the merchant's sales associate to the end user without exposing the end user's phone number to the merchant.

In this "man-in-the-middle" role, the intermediate communications proxy 14 may receive an authorized incoming call from a merchant and in response call the end user (optionally including a pre-announcement identifying the merchant and/or purpose of the call). Assuming that the end user accepts the call, e.g., via touchtone or voice affirmation, the intermediate communications proxy 14 connects the two calls.

The ACSS 10 may also intelligently monitor the communications, e.g., such as by recognizing that the end user refused its call, or immediately hanging up upon being connected to the merchant. If the end user is still connected to the ACSS 10 on a voice connection, the ACSS 10 may offer a voice prompt menu that gives the end user the option of revoking the private token 22, to prevent further voice call attempts by the merchant. Additionally, or alternatively, the ACSS 10 may send an email message, text, or the like, inviting the end user to revoke the private token 22, or to otherwise manage settings maintained by the ACSS 10 for the end user.

In another example, a merchant wants to reach out to a specific end user. The merchant may address a REST (REpresentational State Transfer) endpoint with: (1) a source email address; (2) an end user private token 22; and (3) the message to be conveyed. Another alternative is that a communication provider providing or associated with the ACSS 10 has an email service running where the merchant can use an addressing schema mailto:token@provider.com. However, such a schema should be used only if there is an encrypted socket connection to provider.com.

In both examples the private token communication service provided by the ACSS 10 insures that end users remain anonymous, or at least insures that the ACSS 10 does not reveal the actual contact information of its end users. Retailers as second parties 18 also benefit in that the identities of their individual sales and support staff are not exposed to end users when communications are conducted on the anonymous basis provided by the ACSS 10. Such "anonymization" allows merchants and other organizations to contact customers and prospective customers using connected services, such as VoIP, SKYPE, GOOGLE TALK, APPLE FACETIME, etc., without revealing the network address and contact information of the support and sales staff making such calls.

The ACSS 10 also may be configured to collect valuable statistics for the token-based services it provides, such as for regulatory purposes, auditing purposes, resolving customer disputes, etc. Of course, such extensions are optional as compared to the underlying anonymization services provided by the ACSS 10. Other variations are contemplated, too. For example, the ACSS 10 is not limited to REST-based addressing schemas.

That is, if the ACSS 10 is based on OAuth, REST usage is mandated by that standard. In such configurations, the private tokens 22 are used for communication setup via REST requests, e.g., submitted by second parties 18 in possession of respective ones of the private tokens 22 issued by the ACSS 10. Alternatively, individual first parties 16 may issue or pre-allocate private tokens 22. Tokens may be provided to endpoints other than REST endpoints, e.g., for SIP, XMPP, and other such communications.

When a private token 22 is used in other protocols, the private token 22 may be conveyed, for example, in header information used by that protocol. In an REST/HTTP example, a private token 22 can be conveyed in the Authentication header portion. In an example configuration that shields the first party's real identity, the user agent (hardware/software device or system) may use the private token 22 in the "user field" of such a protocol, instead of a real user identity. For example, a user field might be sip:jkfdiri3874ksdhs8339@anonymous.communication.example.com for SIP, or mailto:jkfdiri3874ksdhs8339 anonymous.communication.example.com for email.

In other variations contemplated herein, the private tokens 22 may carry certain "personalization" information that does not reveal first-party identifying information and yet allows a second party 18 to personalize in some sense a given electronic communication 24. For example, the private token 22 issued to a given second party 18 may include a zip code of the targeted first party 16, which can be used to calculate shipping costs, compute taxes, etc., for a contemplated transaction between the first and second parties 16, 18.

In another example, a first party 16 conducts a transaction with a second party 18 that will involve the shipping of product to the first party 16. The first party 16 has a trusted relationship with a shipping company. The second party 18 requests a code from the shipping company and uses that code to populate the address field of a shipping label prepared by the second party 18. When the package is to be routed by the shipping company, the code can then be exchanged for private token 22. In turn, the shipping company submits the private token 22 to an "anonymization" REST service provided by the ACSS 10, to get the shipping address in clear text. The exchange requires a secret that only the shipping company knows. In this way, it is safe to print the code onto a shipment package or have it encoded in a QR code sticker. Advantageously, the first party's actual postal address is not revealed to the second party 18, and yet the second party 18 can generate shipping labels and entrust packages with the shipping company, because the shipping company will be able to map the address codes printed by the second party 18 to actual addresses, via the ACSS 10.

In another aspect of "consumer friendliness," the ACSS 10 may be owned or operated by an entity that is already "trusted" in some sense by a plurality of first parties 16. For example, a communications network operator, ISP, cable provider, etc., may operate the ACSS 10 or may have a service agreement in place with one or more ACSS operators. Such an arrangement means that users of such services can allow their subscriber contact information to be used by the ACSS 10. Subscriber profiles also may be extended to include identifications of second parties 18 that are pre-approved at least for certain kinds of communications, or blocked, etc.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of providing an anonymous communication service between a first party and a second party comprising:
   receiving a connection request at an anonymous services host from a user agent which was redirected to the anonymous services host from a first external server, said user agent associated with the first party and the first external server associated with the second party;
   identifying the second party and a proposed communication between the second party and the first party, from information received in conjunction with the connection request received from the user agent;
   obtaining an indication that the first party consents to the proposed communication;
   generating a private token for anonymously transacting the proposed communication, said private token including a token identifier that does not reveal actual contact information of the first party but is privately mapped by the anonymous services host to the actual contact information of the first party;
   redirecting the user agent back to the first or a second external server associated with the second party, in response to the indication of consent, said redirecting including sending a temporary token identifier for use by the second party in requesting the private token;
   sending the private token to the second party in response to receiving a token request from the second party that indicates the temporary token identifier;
   receiving the private token from the second party in conjunction with the second party attempting an electronic communication;
   verifying that the private token is valid and that the electronic communication conforms to the proposed communication; and
   in response to such verifications, relaying the electronic communication through an intermediate communications proxy, based on mapping the private token to the actual contact information of the first party.

2. The method of claim 1, wherein said step of obtaining the indication that the first party consents to the proposed communication comprises interacting with the first party through a connection with the user agent.

3. The method of claim 1, wherein said step of obtaining the indication that the first party consents to the proposed communications comprises evaluating consent information stored for the first party in a database in or accessible to the anonymous services host.

4. The method of claim 1, further comprising receiving the actual contact information of the first party either from stored contact information accessible to the anonymous services host, or from input received through the user agent.

5. The method of claim 1, wherein said step of verifying the private token includes verifying that the first party has not requested revocation of the private token.

6. The method of claim 1, further comprising receiving a revocation request from the first party and, in response, marking the private token as revoked, to thereby prevent verification of the private token in any later attempt by the second party to use the private token.

7. The method of claim 1, wherein said step of generating the private token comprises generating the private token so that it is uniquely keyed to identifying information for the first and second parties, and to the proposed communication, thereby restricting usage of the private token only to the second party and only for the proposed communication.

8. The method of claim 1, wherein said step of relaying the electronic communication through the intermediate communications proxy comprises at least one of:
   relaying an electronic message from the second party to the first party, based on receiving the electronic message at a first address that was specified by the private token and forwarding the electronic message to a second address that is known for the first party from the actual contact information of the first party; and
   initiating an electronic connection between the second and first parties via the intermediate communications proxy, wherein the private token specifies a first contact number for use by the second party in initiating the electronic connection, and wherein the intermediate communications proxy maps that first contact number to a second contact number that is known for the first party from the actual contact information of the first party.

9. The method of claim 8, wherein the electronic message comprises one or more of an SMS message, an MMS message, and an email message, and wherein the electronic connection comprises at least one of a circuit-switched or packet-switched voice call, and a multimedia data session.

10. The method of claim 1, wherein the method further includes:
   issuing private tokens on demand, to enable anonymous communications between individual first parties and respective second parties, in conformance with and subject to all limitations imposed by said private tokens;
   revoking particular ones of the issued private tokens responsive to one or more automatic revocation parameters being satisfied or responsive to explicitly received revocation requests from the involved first parties for whom the particular private tokens were issued; and
   enabling the proposed communications via the intermediate communications proxy on an on-demand basis, in response to receiving and verifying individual ones of the private tokens in conjunction with attempted electronic communications by given ones of the second parties submitting those individual private tokens.

11. The method of claim 1, wherein said step of sending the private token to the second party in response to receiving the token request from the second party that indicates the temporary token identifier, includes receiving authentication information in or with the token request and conditioning issuance of the private token to the second party on validation of the temporary token identifier and authentication of the authentication information.

12. An anonymous communication services system configured to enable anonymous communication between a first party and a second party and comprising:
   an anonymous services host including one or more communication interfaces and associated processing circuits, which are configured to:
      receive a connection request at an anonymous services host from a user agent which was redirected to the anonymous services host from a first external server, said user agent associated with the first party and the first external server associated with the second party;
      identify the second party and a proposed communication between the second party and the first party, from information received in conjunction with the connection request received from the user agent;
      obtain an indication that the first party consents to the proposed communication;
      generate a private token for anonymously transacting the proposed communication, said private token including a token identifier that does not reveal actual contact information of the first party but is privately mapped by the anonymous services host to the actual contact information of the first party;
      redirect the user agent back to the first or a second external server associated with the second party, in response to the indication of consent, said redirecting including sending a temporary token identifier for use by the second party in requesting the private token;
      send the private token to the second party in response to receiving a token request from the second party that indicates the temporary token identifier;
      receive the private token from the second party in conjunction with the second party attempting an electronic communication;
      verify that the private token is valid and that the electronic communication conforms to the proposed communication; and
   an intermediate communications proxy comprising one or more communication interfaces and associated processing circuits, which are configured to, in response to verification of the private token and the electronic communication by the anonymous services host, relay the electronic communication to the first party, based on mapping the private token to the actual contact information of the first party.

13. The anonymous communication services system of claim 12, wherein the anonymous services host is configured to obtain the indication that the first party consents to the proposed communication based on being configured to interact with the first party through a connection with the user agent.

14. The anonymous communication services system of claim 12, wherein the anonymous services host is configured to obtain the indication that the first party consents to the proposed communications based on being configured to evaluate consent information stored for the first party in a database in or accessible to the anonymous services host.

15. The anonymous communication services system of claim 12, wherein the anonymous services host is configured to receive the actual contact information of the first party either from stored contact information accessible to the anonymous services host, or from input received through the user agent.

16. The anonymous communication services system of claim 12, wherein the anonymous services host is configured to verify the private token based on being configured to verify that the first party has not requested revocation of the private token.

17. The anonymous communication services system of claim 12, wherein the anonymous services host is configured to receive a revocation request from the first party and, in response, mark the private token as revoked, to thereby prevent verification of the private token in any later attempt by the second party to use the private token.

18. The anonymous communication services system of claim 12, wherein the anonymous services host is configured to generate the private token so that it is uniquely keyed to identifying information for the first and second parties, and to the proposed communication, thereby restricting usage of the private token only to the second party and only for the proposed communication.

19. The anonymous communication services system of claim 12, wherein the intermediate communications proxy is configured to relay the electronic communication based on being configured to:
   relay an electronic message from the second party to the first party, based on receiving the electronic message at a first address that was specified by the private token and forwarding the electronic message to a second address that is known for the first party from the actual contact information of the first party; and
   initiate an electronic connection between the second and first parties via the intermediate communications proxy, wherein the private token specifies a first contact number for use by the second party in initiating the electronic connection, and wherein the intermediate communications proxy is configured to map that first contact number to a second contact number that is known for the first party from the actual contact information of the first part.

20. The anonymous communication services system of claim 19, wherein the electronic message comprises one or more of an SMS message, an MMS message, and an email message, and wherein the electronic connection comprises at least one of a circuit-switched or packet-switched voice call, and a multimedia data session.

21. The anonymous communication services system of claim 12, wherein the anonymous communication services system is configured to:
   issue private tokens on demand, to enable anonymous communications between individual first parties and respective second parties, in conformance with and subject to all limitations imposed by said private tokens;
   revoke particular ones of the issued private tokens responsive to one or more automatic revocation parameters being satisfied or responsive to explicitly received revocation requests from the involved first parties for whom the particular private tokens were issued; and
   enable the proposed communications via the intermediate communications proxy on an on-demand basis, in response to receiving and verifying individual ones of the private tokens in conjunction with attempted electronic communications by given ones of the second parties submitting those individual private tokens.

22. The anonymous communication services system of claim 12, wherein the anonymous communication services system is configured to condition issuance of the private token to the second party on validation of the temporary token identifier received from the second party in a request for the private token and further on authentication of authentication information received in or with said request.

* * * * *